United States Patent
Kazmi et al.

(10) Patent No.: US 8,531,967 B2
(45) Date of Patent: Sep. 10, 2013

(54) OPTIMIZING THE USAGE OF RADIO RESOURCES BY CROSS-LAYER READING OF INFORMATION FROM HIGHER LEVEL CONTROL PLANE PROTOCOL LAYER

(75) Inventors: Muhammad Kazmi, Bromma (SE); Gabor Fodor, Hässelby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 366 days.

(21) Appl. No.: 12/988,057

(22) PCT Filed: Apr. 18, 2008

(86) PCT No.: PCT/SE2008/050443
§ 371 (c)(1),
(2), (4) Date: Oct. 15, 2010

(87) PCT Pub. No.: WO2009/128755
PCT Pub. Date: Oct. 22, 2009

(65) Prior Publication Data
US 2011/0032898 A1 Feb. 10, 2011

(51) Int. Cl.
*H04J 1/16* (2006.01)
*H04J 3/16* (2006.01)

(52) U.S. Cl.
USPC ............... 370/236.2; 370/469; 709/228

(58) Field of Classification Search
USPC .............. 370/236.2, 252, 328, 465, 468, 469; 709/228, 227
See application file for complete search history.

(56) References Cited

U.S. PATENT DOCUMENTS

| | | | |
|---|---|---|---|
| 2003/0161326 A1* | 8/2003 | Pazhyannur et al. | 370/395.52 |
| 2005/0130611 A1* | 6/2005 | Lu et al. | 455/130 |
| 2007/0070915 A1* | 3/2007 | Kroboth et al. | 370/252 |
| 2008/0137683 A1* | 6/2008 | Xie et al. | 370/432 |
| 2008/0151758 A1 | 6/2008 | Weinrib et al. | |
| 2010/0238840 A1* | 9/2010 | Lu et al. | 370/259 |
| 2011/0019688 A9* | 1/2011 | Xie et al. | 370/432 |
| 2011/0032898 A1* | 2/2011 | Kazmi et al. | 370/329 |

OTHER PUBLICATIONS

Raman B et al "Arguments for cross-layer optimizations in Bluetooth scatternets." Applications and the Internet, 2001. Proceedings. 2001 Symposium on San Diego.

* cited by examiner

*Primary Examiner* — Andrew Lee

(57) ABSTRACT

Methods and apparatuses relating to optimization of radio network resources between user equipments operating in a cell and nodes in a cellular radio communication network are provided. Cross-layer information is read from higher level control plane protocol layer packets being transported, before or during lower level control plane protocol layer procedures being performed between a user equipment and a node or between two nodes. The lower level control plane protocol layer procedures are optimized by using the analyzed control plane information received.

18 Claims, 5 Drawing Sheets

US 8,531,967 B2

1

OPTIMIZING THE USAGE OF RADIO RESOURCES BY CROSS-LAYER READING OF INFORMATION FROM HIGHER LEVEL CONTROL PLANE PROTOCOL LAYER

TECHNICAL FIELD OF THE INVENTION

The present invention generally concerns methods and apparatuses relating to cellular radio communication. Specifically, the present invention relates to optimization of radio network resources between user equipments operating in a cell and nodes in a cellular radio communication network using a plurality of protocol layers supporting procedures such as control signaling, traffic control and managing radio network resources.

DESCRIPTION OF RELATED ART

The advanced versions of the Global System for Mobile Communications (GSM), the so called Enhanced Data Rates for Global Evolution (EDGE) radio access networks (GE-RAN) as well as Wideband Code Division Multiple Access (WCDMA) and Long Term Evolution (LTE) systems are designed to offer a variety of multimedia services. Such services include voice and video over the Internet Protocol (IP), IP multimedia, gaming, email, various presence and messaging services, chatting etc. In addition, these networks also allow subscribers to simultaneously access multiple services. The development of new services is an on going process. Thus, network infrastructure that involves considerable capital expenses (including hardware and transmission costs) must be capable to support these and future services in terms of fulfilling their respective Quality of Service (QoS) targets.

From a QoS point of view, services are broadly categorized as real time and non-real time services. Due to recent progresses in service development, both these categories contain a large number of services, which have captured the interest of end users. Furthermore, even services belonging to the same broad category (real time or non-real time) typically have significant differences in terms of traffic pattern, end user expectation, delay and packet error ratio target, reliability/security requirements, etc.

In general, efficient radio resource management (RRM) is essential to optimize the usage of radio resources. The complexity of RRM algorithms increases in the presence of a large number of different services. For instance, services based on the Hyper Text Transfer Protocol (HTTP) as well as many presence services can be regarded as the broad category "non-real time". However, admission control requirements are considerably different: an HTTP packet is typically larger than that of presence services. On the other hand, a presence service is likely to be more time critical. Paradoxically, an HTTP packet can sometimes be smaller (but equally time critical as that of a presence service) depending upon what type of information the subscriber intends to retrieve. Intuitively, a 'service aware' (as opposed to the traditional 'broad category aware') admission control entity (and algorithm) at the Radio Base Station (RBS) does not only lead to more efficient use of network resources, but can also result in better subscriber satisfaction.

Taking into account higher level user plane protocol layer specific information when designing lower level user plane protocol layer algorithms has been widely recognized in the field of cross-layer engineering. These efforts have generally focused on improving the user plane protocol performance. For instance, cross-layer communication has been widely studied in the context of joint source and channel coding to improve the bit error rate performance and spectrum efficiency of the user plane of various real time and non-real time applications.

In prior art resource allocation methodology and RRM mechanisms, the network scheduler or resource assigner, in the Base Transceiver Station (BTS) or Radio Network Controller (RNC), assigns resources in accordance with the required QoS, and traffic priority as configured by the Core Network (CN). These priorities are in turn set as a result of a negotiation between an application server and the CN and/or Radio Access Network (RAN). If there is any change in a service request from the subscriber, the associated priority level can be revised after re-negotiation(s) between the application server and the network.

In the prior art technology, the radio access network (RAN) in general and the RRM entity of the RAN in particular, cannot execute the relevant procedures while service negotiations or re-negotiations between the subscriber and the application server, and between the application server and the radio or CN are in operation. This is because most RRM functions such as admission control, connection re-direction, resource allocation and channel re-configuration, etc, are highly dependent upon the amount of resources, which in turn rely upon a particular service request (characterized by a set of associated QoS parameters). A consequence of the prior art arrangement is an extra delay (measured from the time instant when the user initiates a service until the first user data package can be transmitted) in the execution of some of the RRM procedures.

Eventually, the radio network is requested a certain priority level (and other QoS parameters) for the given service and may also be associated with the given user or user class. Obviously, this does not make the radio network aware of the actual service request sent by the subscriber to the application server. This entails that the radio network decisions (RRM, scheduling etc) are based on the prior art QoS parameters, belonging to the so called broad category, rather than detailed knowledge of the actual service for which the radio bearer is established. When the prior art QoS architecture was designed, there were a few major categories of services such as voice, video, streaming, data, etc. However, the last few years have witnessed an unprecedented growth and creation of new services. As of today, even a single broad category of a service (such as real time or packet data) could be further categorized in sub-sets of services with at least some distinguishing characteristics.

EP-1798897 A1 (NTT DOCOMO INC), 12 Dec. 2005, relates to an apparatus for determining policy of different types of applications including transmission policies defining transmission parameters, and a sum of first and second scores is maximized for transmission in consecutive transmission interval. This leads to the optimization of network architectures to maximize network capacity and to provide high quality services to the largest possible number of users. Furthermore, allocation of resources across all users and applications is optimized to ensure the satisfaction of the users at the minimum resource cost. Further is opened a highly flexible framework for cross-layer optimization, such as adaptation of the application to the transport, network, data-link, and physical level protocol layer characteristics, and the adaptation of the physical, data link or network level protocol layers to the application requirements.

GB-2418566 A, (SAMSUNG ELECTRONICS CO LTD), 29 Mar. 2006, relates to a handover using a transport level protocol layer and an application level protocol layer. A method is described of handing over a communication link between a mobile communication device and a first network to a second network by sending a message via a transport level device (or from a Mobile Internet Protocol (MIP) client) to an application level device (or to a Session Initiation Protocol (SIP) user) located in the mobile communication device. Further is included a foreign agent server adapted for use during the handover wherein the foreign agent comprises a Session Initiation Protocol proxy server. It is included a Session Initiation Protocol RE-INVITE message being sent, that comprises the step of including a foreign agent server's IP address within the contact field of the message, said foreign agent server adapted for use during the handover of a communication link.

US-20050286438 A1, (SAMSUNG ELECTRONICS CO LTD), 29 Dec. 2005, relates to a method for providing cross-layer QoS functionality in a wireless network. The method includes obtaining QoS data from each protocol layer of an application stack for a particular application. A QoS matrix is generated based on the obtained QoS data. Packet distribution for the particular application may then be prioritized based on the QoS matrix.

WO-2005041516 A2, (DOCOMO COMM LAB EUROP GMBH), 6 May 2005, relates to a provision unit providing abstraction models for modeling characteristic of two different communication protocol layers based on the parameters of corresponding communication protocol layers. The parameters of the communication protocol layers are optimized using the abstraction models, communication channel property and optimization goal. The optimized parameters are provided to the communication protocol layers. By using protocol layered communication system such as wireless internet, operation of communication protocol layer for providing plain old telephony service (POTS) can be controlled.

H. Holma and A. Toskala, "WCDMA for UMTS—Radio Access for Third Generation Mobile Communications", Third Edition, WILEY, 2004. ISBN 0-470-87096-6 relates to general information about the radio communication network.

3GPP TR 25.913, "Requirements for Evolved UTRA (E-UTRA) and Evolved UTRAN (E-UTRAN)" relates to general information about the radio communication network.

V. Srivastava and M. Motani, "Cross-Layer Design: A Survey and the Road Ahead", IEEE Communications Magazine, pp. 112-119, December 2005 relates to general information about cross-layer design.

Accordingly, it would be highly desirable in a cellular radio communication network, to not make the radio network decisions based solely on the prior art QoS parameters (typically signaled from the core network to the radio network), which may lead to suboptimal usage of network resources. Instead, an optimal usage of radio network resources with respect to the specific requested service (typically signaled by the user or some application level server) for user equipments in cellular radio communication network is desirable.

SUMMARY OF THE INVENTION

The problem dealt with by the present invention is enabling improved optimization of radio resources for user equipments in a cellular radio communication network using a communication protocol with a plurality of communication protocol layers, each layer supporting a certain control plane procedure such as control signaling, traffic control and managing radio network resources between user equipments and a node, or between nodes in the network.

According to a first aspect, the invention includes a method for optimizing the usage of radio resources in a cellular radio communication network using a communication protocol, with a plurality of communication protocol layers. Each layer supporting a certain control plane procedure such as control signaling, traffic control and managing radio network resources between at least one user equipment and a node, or between at least two nodes in said network. By analyzing information received from reading higher level control plane protocol layer packets being transported, before or during lower level control plane protocol layer procedures being performed, optimization of the lower level control plane protocol layer procedures, by using the analyzed higher level control plane information is received.

According to a second aspect, the invention includes a node in a radio communication network for optimizing the usage of radio resources, using a communication protocol with a plurality of communication protocol layers. Each layer supporting a certain control plane procedure such as control signaling, traffic control and managing radio network resources between at least one user equipment and the node, or between said node and at least another node in said network. The node comprising means for reading higher level control plane protocol layer packets before or during lower level control plane protocol layer procedures being performed, means for analyzing said information received from reading higher level control plane packets and means for optimizing the lower level control plane protocol layer procedures by using the analyzed information received.

A general advantage of the invention is that it enables the system to support future services in terms of fulfilling their quality targets in a flexible way.

An advantage of some exemplary embodiments of the invention is that it allows the system to improve the control plane related quality of service in relation to the quality of experience at a low radio resource cost.

A further advantage of some exemplary embodiments of the invention is that it results in less delay measured from the time instance that the user requests a certain service until the proper radio resource management action by the radio access network takes place.

Still an advantage of some exemplary embodiments of the invention is an optimal usage of network resources by using not only the radio network decisions based on the state of the art quality of service parameters, but also including information received from reading information from higher level control plane protocol layers.

Still further another advantage of some exemplary embodiments of the invention is that a "service aware" admission control entity at a radio base station node leads to more efficient use of network resource resulting in enhanced subscriber satisfaction. The user perceived quality of service and quality of experience does not only depend on the user plane performance, but also on the control plane performance, notably the delay of signaling messages exchanged between the user equipment and network. Specifically, the delay when setting up a service and/or awaiting a reply from a user equipment that the first user equipment is communicating with, has a major impact on the user perceived quality of service in relation to quality of experience.

A further advantage of some exemplary embodiments of the invention is that it optimizes the Call Setup procedures and leads to a close to optimum (service specific) usage of radio network resources.

Another further advantage of some exemplary embodiments of the invention is the reduction of overall delay specifically in the Call Setup, Admission Control, Redirection of Calls, Call Termination and Measurement Configuration procedures.

Other objects, advantages and novel features of the invention will become apparent from the following detailed description of the invention when considered in conjunction with the accompanying drawings and claims.

DESCRIPTION OF PREFERRED EMBODIMENTS

The present invention is particularly suited but is not limited to use in second generation digital systems, such as e.g. the European Global System for Mobile communications (GSM), and the advanced versions of GSM, the so called Enhanced Data Rates for Global Evolution (EDGE) radio access networks (GERAN). Further suited for third generation Public Land Mobile Networks (PLMNs) such as e.g. Wideband Code Division Multiple Access (WCDMA) and CDMA-2000, Time Division-Synchronous Code Division Multiple Access (TD-SCDMA). The present invention is also applicable to wireless communication systems beyond 3G systems, such as the Long Term Evolution (LTE) systems. Broadly speaking, the present invention is suited for any cellular radio communication network.

Figure 1:
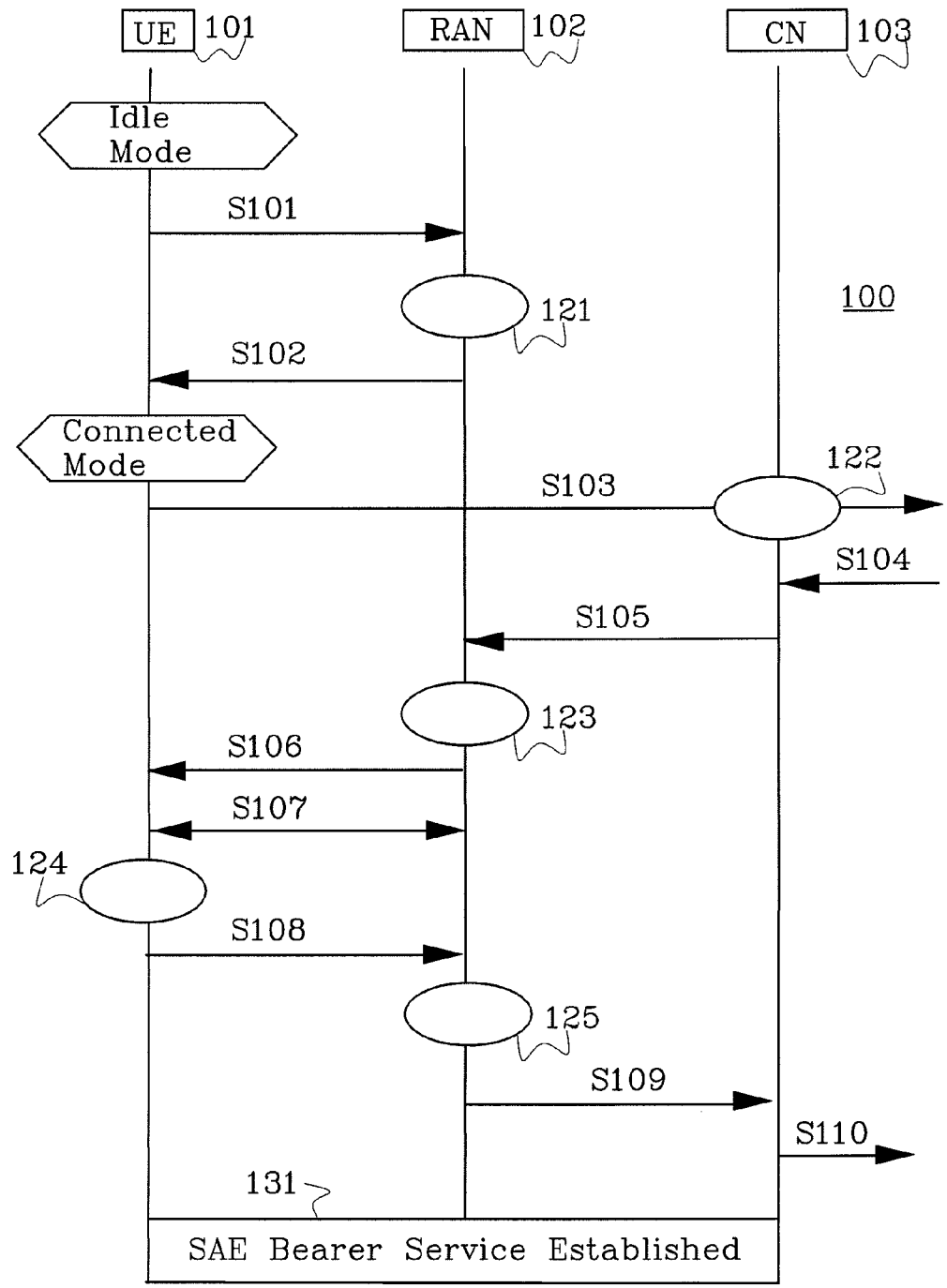
FIG. 1 is a signal diagram illustrating exemplary embodiments of exchange of signals in the cellular radio communication network in which the present invention may be employed.

FIG. 1 shows, from the point of view of the invention in the signal diagram 100, the essential parts of a high level control plane protocol layer view of the Call Setup procedure, exemplified by the 3GPP System Architecture Evolution (SAE) Bearer Service Establishment and the essential parts of the establishment of the System Architecture Evolution (SAE) bearer service as provided by the radio access network, in release 5/6 UMTS Quality of Service (QoS) architecture. A User Equipment (UE) 101 provides a high level control plane protocol layer description of the requested service to the Core Network (CN) 103 by requesting the Universal Mobile Telecommunications System (UMTS) bearer service. The CN 103 requests the necessary resources e.g. in the associated Radio Access Bearer Request S105. Likewise, in the evolved QoS architecture for LTE, the UE 101 provides an application level service request, e.g. using the Session Initiation Protocol and Session Description Protocol (SIP/SDP) S103, and the CN 103 requests the appropriate System Architecture Evolution (SAE) bearers. In both cases, the Radio Access Network (RAN) 102 processes are triggered after a series of Non Access Stratum (NAS) processes between the UE 101 and the CN 103.

The UE 101 requires a specific service using a higher level control plane protocol layer S103. The CN 103 e.g. translates this service request to a radio bearer establishment including lower level control plane protocol layer description of the necessary radio bearers. The Radio Resource Management (RRM) entity in the Radio Access Network (RAN) 102 is thus "late" in getting to know that the UE 101 has initiated a particular service.

Firstly, the UE 101 is in idle mode and a signal S101 is e.g. a RRC Connection Setup message transmitted and received by the RAN 102. In the RAN 102, an Admission Procedure 1, 121, is performed comprising: Admission of a RRC Connection. Signal S102 is e.g. a RRC Connection Setup message transmitted back to the UE 101, resulting in the UE 101 being in connected mode. Signal S103 is a higher level control plane protocol layer signaling by e.g. a Request Service message transmitted from the UE 101 (SIP/SDP, HTTP, FTP . . . ) to an application layer server (not shown), such as e.g. a Internet Multimedia Subsystem (IMS) Server, a Chat Server, a Presence Server, etc. In CN 103 e.g. a CN Admission Control Procedure 2-3, 122, is performed comprising: Service and User authentication and authorization and a CN 103 resource verification (based on the service description parameters in the higher layer signaling). Signal S104 that is received by the CN 103 is e.g. a Create Dedicated Bearer Request message transported in a high level control plane protocol layer, such as e.g. a service protocol layer (via the Policy Control and Resource Function (PCRF), Packet Data Network Gateway (PDN GW) and Serving Gateway (GW)) that comprise a QoS Information. See further in the 3GPP Technical Specification TS 23.401.

The QoS information depends on a service type:
Label (~QoS Class Identifier providing a high level QoS description of the service, e.g. voice, email, chat, etc.)
Guaranteed Bit Rate/Maximum Bit Rate/Aggregate Maximum Bit Rate (GBR/MBR/AMBR)
Allocation Retention Priority (ARP)
Uplink/Downlink Packet filters Signal S105 between CN 103 to RAN 102 is e.g. an exemplary System Architecture Evolution (SAE) Bearer Setup Request message sent through S1 interface. S104 and S105 are constructed by CN 103 entities based on the Service Request message S103 originated by the UE 101. The S1 interface includes e.g. the QoS Label, Maximum Bit Rate/Guaranteed Bit Rate/Aggregate Maximum Bit Rate (MBR/GBR/AMBR), Allocation Retention Priority (ARP) plus Non-access Stratum (NAS) and Uplink filters.

In RAN 102 upon the SAE Bearer Setup Request message is received in 123, Radio Admission Control (RAC) takes place.

The RAC needs an Access Category (AC) for Guaranteed Bit Rate (GBR) services, in order to:
Allocate radio/transport resources
Configure Media Access Control (MAC) scheduler.

Signal S106 from RAN 102 to UE 101 is e.g. a Radio Resource Control (RRC) message triggered by the SAE Radio Setup Request message. The message S103 for example includes:
Piggybacked NAS (containing Uplink filter)
Radio Bearer Identity Signal S107 between UE 101 and RAN node 102 is e.g. a Physical Radio Bearer Setup Establishment message. It involves the evaluation and reservation of the physical radio resources. The UE 101 performs UE internal configuration and binding of application in 124, Uplink Filtering, and transmits the SAE and Physical Radio Bearer Setup message to the RAN node 102. Signal S108 from UE 101 to RAN node 102 is e.g. a Radio Bearer Setup Resource Control (RRC) message piggybacking NAS response. In the RAN 102 e.g. an Admission Procedure 4, 125, is performed comprising: Check the availability of radio resources, transport network resources and hardware resources before admitting new radio bearer or handover radio bearer. Signal S109 from RAN node 102 to CN 103 is e.g. a SAE Radio Bearer Setup Response message piggybacking NAS response. Signal S110 from CN 103 is e.g. a Create Dedicated Bearer Response message. SAE bearer service is finally established in 131.

The user perceived Quality of Service (QoS) and Quality of Experience (QoE) do not only depend on the user plane performance, but also on the control plane. Notably, the delay when setting up a service and/or awaiting a reply from a UE that the first UE 101 is communicating with, has a major impact on the user perceived QoS/QoE.

An exemplary embodiment according to the invention, allows the system to improve the control plane related QoS/QoE at a low radio resource cost, by utilizing higher level control plane protocol layer information (e.g. application level control plane protocol layer) in the RAN 102 in order to execute lower level control plane protocol layer procedures parallel with higher level control plane protocol layer procedures.

Figure 2:
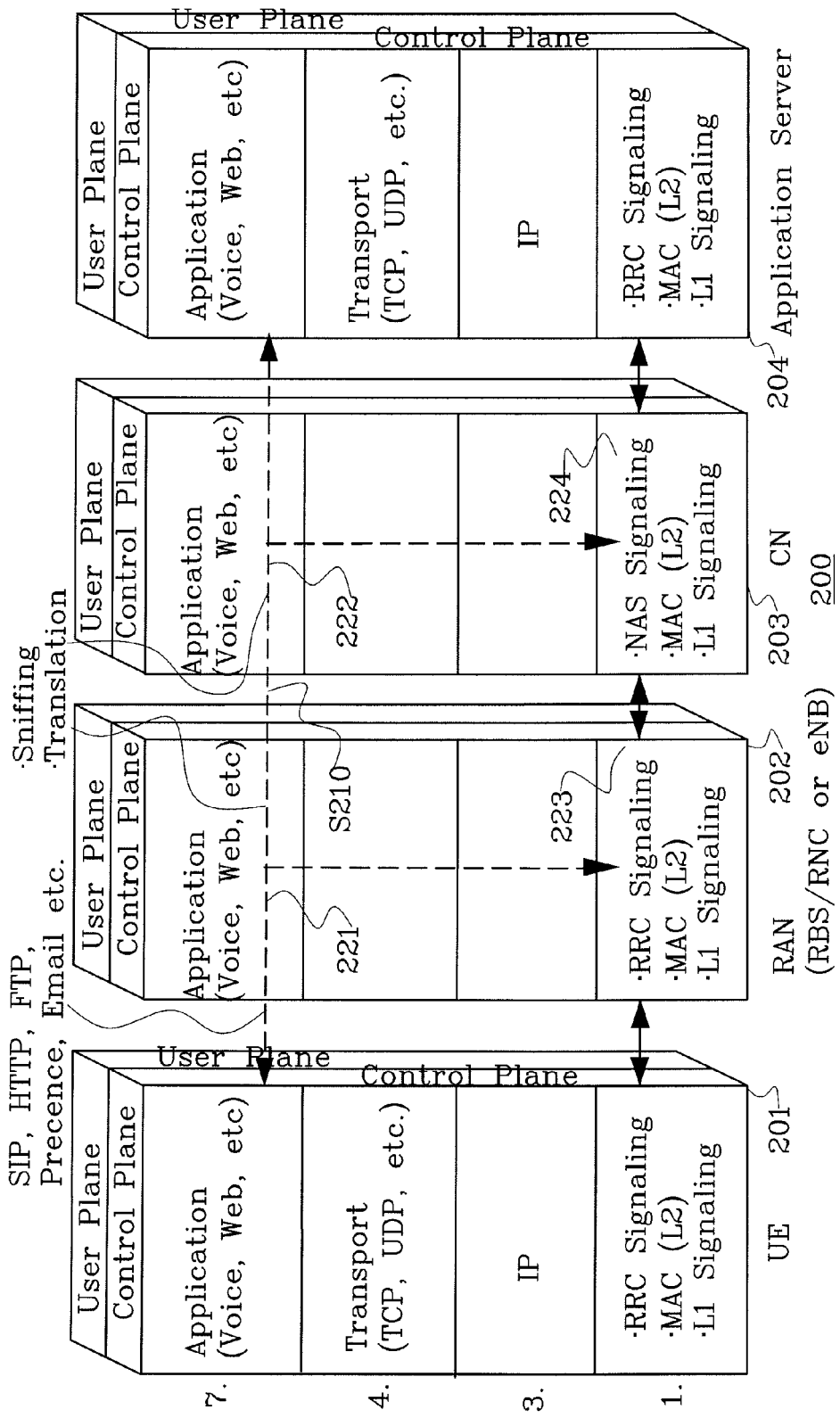
FIG. 2 is a block diagram illustrating exemplary embodiments of cross-layer reading of information according to the invention.

FIG. 2 is a signal diagram 200 illustrating exemplary embodiments in dashed lines of the sniffing, i.e. cross-layer reading of information and of the translation of the sniffed information in 221 in the RAN 202, and if necessary in 222 in the CN 203 according to the invention. Parts of example horizontal protocol stacks from Open Systems Interconnection Basic Reference Model (OSI Model) in UE 201, RAN 202, CN 203 and Application Server 204 are shown, with the highest level represented by the application layer 7, transport layer 4, network layer 3 and lowest level represented by the physical layer 1. A communications protocol is the set of standard rules for data representation, signaling and control signaling, traffic and traffic control and rules for managing radio network resources, for example authentication and error detection required to send information over a communications channel. Protocol layering accomplishes its objectives by dividing the protocol design into a number of smaller parts, each of which performs closely related sub-tasks, and interacts with other layers of the protocol only in a small number of well-defined ways. Within the layers it is possible to distinguish between control aspects and user data transfer aspects, which creates the vertical structuring to the example horizontal protocol stack in FIG. 2. In the vertical view a user plane and control plane are logically independent to the horizontal layers. As a person skilled in the art appreciates a user plane provides for user information transfer, along with associated controls (e.g., flow control, error control), and control plane performs e.g. routing path control and/or connection control functions, ensure system-wide control of communication resources and services.

Today all higher level control plane protocol layer signaling goes through the RAN 202 and the CNs 203, by the exemplary embodiment of the invention the RAN 202 or CN 203 is now able to access the higher level control plane protocol layer information, e.g. by inspecting signal S210 and the structure of transported control plane protocol layer packets, e.g. application control plane protocol layer packets. As a person skilled in the art appreciates, this new device of sniffing or reading in the RAN 202 or CN 203 is for example performed by inspecting the signal S210, using known protocol analysis techniques. Such protocol analysis techniques can for example include real time packet capturing and header analysis, protocol decoders for voice packets, VoIP call monitoring and analysis tools, so called network sniffers, and so on. This new device of sniffing can be turned on automatically upon a start or end of certain session of a higher level control plane protocol layer procedure, e.g. a RRC Connection Setup. Another way of starting the sniffing is when a certain active session of a higher level control plane protocol layer procedure is being modified, or starting only if the RAN 202 is ordered by the Operation and Maintenance Subsystem.

One skilled in the art will appreciate that a RAN is in no way limited to only a whole radio access network, a system of radio base station (RBS) and a Radio Network Controller (RNC) as is common knowledge in WCDMA. Instead a RAN is meant to be interpreted as either a radio base station (RBS) or a Radio Network Controller (RNC), in WCDMA, or Base Station Transceiver (BTS) or a Base Station Controller (BSC), in GSM, depending on which part i.e. e.g. RBS or RNC, as one skilled in the art appreciates, is more suitably for doing the procedure (for example procedures as sniffing, translating, optimizing or analyzing, exemplary embodiments of the invention). As one skilled in the art appreciates, dependant on as well which communication system to be applicable for the invention. If the both parts are interworking a RAN is to be interpreted as the system of RBS and RNC, or if the procedure is dependant on the communication system LTE, a RAN is also to be interpreted as an Enhanced Node B (eNB).

In the description below is also described how the sniffed or read information is analyzed. As a person skilled in the art appreciates, this is meant to be interpreted as after the sniffing, retrieving valuable information from the sniffed higher level control plane protocol layer information, to optimize the RAN 202 and CN 203 procedures. One way is through translation or mapping of the sniffed information. The sniffing as well as the translation can be seen as working in combination or as separate parts not working in combination, and thereby one part alone can describe an exemplary embodiment of the invention. Another way is for example gathering data from the sniffed information of higher level control plane protocol information in e.g. a table in a memory. A probability algorithm can e.g. be used on the gathered information in the table, to read out for example a better priority level, evaluation of resources for resource pre-allocation, a final priority to be set, pre-execution or pre-establishment of some Non-Access Stratum (NAS) procedures. Another way of interpreting analyzing is gathering higher level control plane protocol layer information e.g. in a table in a memory and combine it with the priority level(s), which are set as a consequence of (re-)negotiation between different network entities. Other example of analyzing the sniffed information can be found down below. As a person skilled in the art appreciates the RAN 202 and/or CN 203 is/are modified to incorporate a sniffer (means for sniffing) and an analyzer (means for analyzing), and an optimizer (means for optimizing) or only a sniffer or only a analyzer or only an optimizer. The analyzer is then to be interpreted to be able to comprise any or all of the following functions: the translation or mapping of data, gathering or combining of data in e.g. a table memory, or any algorithm that translates one piece of higher layer control plane information. The sniffer and/or analyzer and/or optimizer may be incorporated as a program or a hardware device etc. This is applicable to all embodiments describing the sniffing or translation or mapping or analyzing or optimizing, according to the invention, further described down below.

Figure 3:
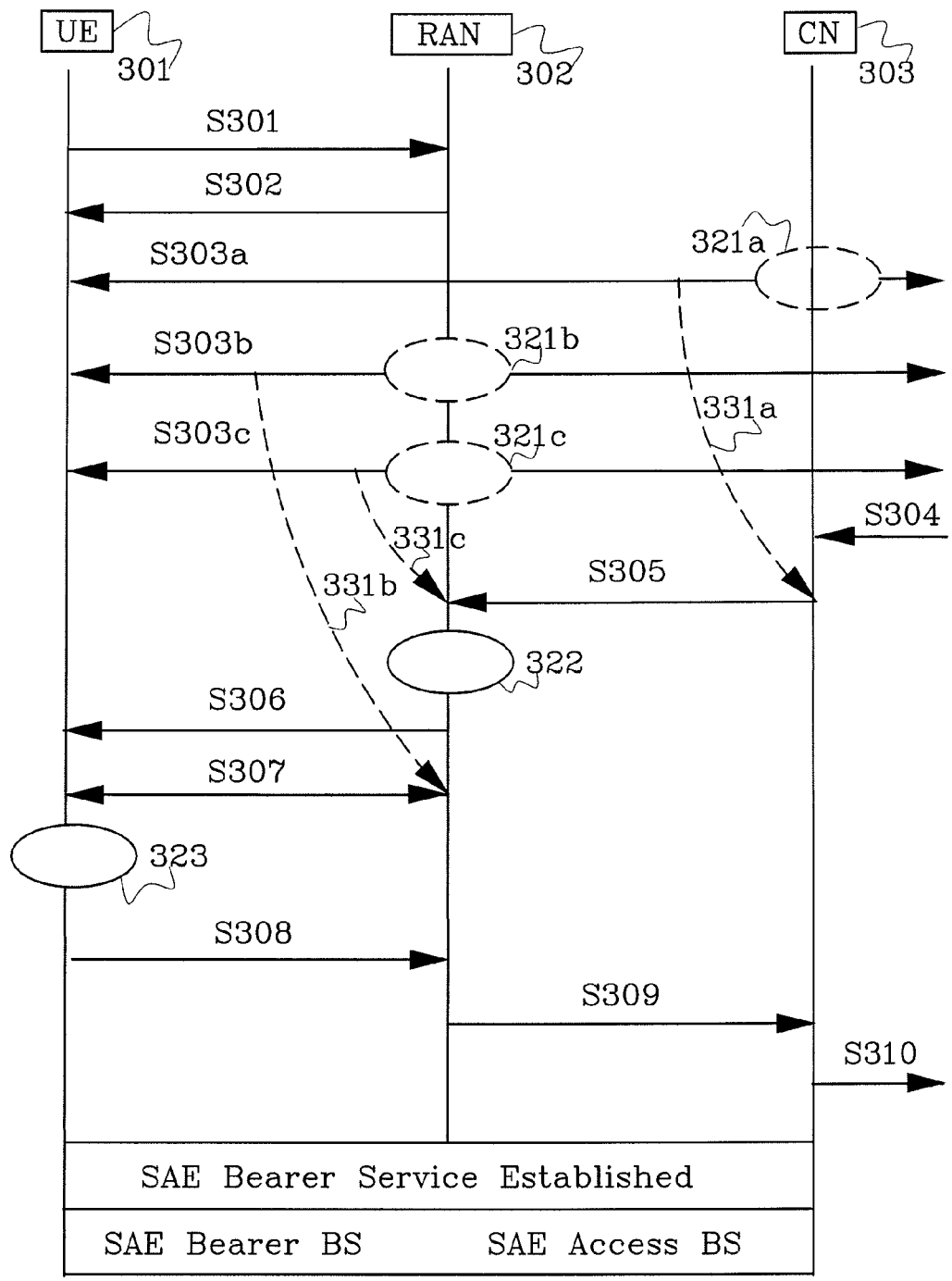
FIG. 3 is a signal diagram illustrating exemplary embodiments of exchange of signals in the cellular radio communication network, including Call Setup, Admission Control and Measurement Configuration procedure according to the invention.

An effective use of the information that can be retrieved from sniffing or reading higher level control plane protocol layer information to optimize RAN and CN procedures and reduce the overall delay in the following manner:

Reduction in Call Setup Delay
Improvement in Admission Control
Early Redirection of Calls
Resource Optimization at Call Termination
Improved Measurement Configuration
Reduction in Call Setup Delay FIG. 3 is a signal diagram 300 illustrating three different exemplary embodiments a-c, illustrated in dashed lines, according to the invention. The following signals and performances in certain nodes in FIG. 1 are comparable to FIG. 3 and are thereby not described again: S104→S304, S105→S305, S106→S306, S107→S307, S108→S308, S109→S309, S110→S310, 123→322, 124→323. Signal S301 is e.g. a RRC Connection Request message sent from UE 301 to RAN 302. Signal S302 is e.g. a RRC Connection Setup message sent from RAN 302 to UE 301. Signal S303a-c is e.g. higher level control plane protocol layer signaling such as for example application protocol layer signaling, wherein the sniffing according to the exemplary embodiments a-c of the invention are performed, as described below. The application level control plane protocol layer signaling is performed between UE 301 and RAN 302 and CN 303 including e.g. HTTP, FTP and SIP/SDP messages sent between UE 301 to RAN 302 to CN 303 as well as to the application server here now shown.

The first exemplary embodiment in FIG. 3 is described in the more detailed view of the Call Setup procedure or also called a SAE Bearer Service Establishment in the 3GPP LTE system in 321a. The CN gateway 303 e.g. sniffs or reads during application control plane layer signaling, e.g. sniffs application packets from signal S303a in 321a in CN 303. By analyzing the information in 321a received from sniffing signal S303a, authentication of the service request can be done early and bearer setup can be started without waiting for the CN 303 procedures to finish and it results in the Create Dedicated Bearer Request procedure in 321a and 305. For example, if the RAN 302 sniffs an Application Layer SIP signaling and reads information carried in the SIP signaling that is the UEs 301 SIP identity and the service description at the SIP level (using session description), the RAN 302 uses this identity and service information that this specific user is entitled to use this specific service and based on this can pre-authorize the usage of radio resources. As an example based on the information received from sniffing a SAE Bearer Request message is constructed and sent to RAN 302.

This will allow the CN 303 to initiate early Authentication (or Pre-authentication) procedure in parallel with the Service Negotiation. In case authentication is not needed (e.g. call re-establishment) the RAN 302 and CNs 303 could directly start the possible procedures during the service negotiation. This embodiment will lead to an improvement in call admission control process which reduces call dropping. This in turn leads to an overall reduction in the call setup delay. This embodiment of the invention, result further in optimization such as that signal S304 can be skipped, i.e. leap frog CN procedures 331a, including authentication, policy translation, CN admission control and resource reservation. As the information received from reading the higher level control plane protocol layer result in having information, that is today not available, already at an earlier stage, by analyzing the information conclusions can be made in 321a and the leapfrog is possible.

Radio bearer service negotiations can now also be optimized by making use of the analyzed sniffed information. For example by combining higher level control plane protocol layer information with the priority level(s), which are set as a consequence of (re-)negotiation between different network entities, a reduction of call setup delay is accomplished and leads to close to optimum (with respect to the specific service) usage of RAN 302 and CN 303 resources. Optimization of priority settings as illustrated by signal 331a and S305 as well as resource allocation that can be optimized is done in RAN 302. Other fundamental tasks such as setting up of power control requiring signaling of some quality target, which in turn directly related to a particular application, can also be performed in the meantime based on the sniffed information in 321b/321c by RAN 302.

The measurement configuration may not be strictly the part of a call setup. It may be done just after the completion of the call setup. However, a call in real sense (i.e. user data communication) would start after UE 301 is properly configured to perform measurements. We can broadly categorize measurements into two categories: mobility related and resource allocation related. One important example of the latter category is that of Channel Quality Indicator (CQI), which is used for downlink scheduling in WCDMA and LTE. Another example is UE 301 transmission power headroom used for uplink scheduling in enhanced uplink WCDMA. The RAN 302 can schedule users or in other words the real call session starts once network has received these measurements.

The second exemplary embodiment of the invention in FIG. 3 is described in the more detailed view of the UE Measurement configuration. By sniffing or using cross-layer communication on signal S303b in 321b in the RAN 302, application control plane protocol layer information can be analyzed to get information, to firstly initiate early measurement control configuration during the call setup phase. This allows faster access to data, i.e. data transmission starts immediately after the call setup phase is terminated. Secondly the higher level control plane protocol layer information analyzed can be used to configure measurements more precisely. For example, the number of Channel Quality Information (CQI) values and their reporting rate, which depend upon the service type, amount of data etc., can be more accurately set by making use of higher level control plane protocol layer information. For example in case of voice over IP only limited CQI reports at regular interval might be sufficient e.g. CQI from 2-3 best resource blocks at every 10 or 20 ms interval. A resource block is time-frequency physical channel in E-UTRAN, which has OFDMA based downlink radio interface. But high data rate service such as Web browsing would require CQI reports measured over larger part of the bandwidth e.g. CQI from 10-20 resource blocks. Especially in LTE system, the UE 301 could be configured to report N best CQI, i.e. CQI of the N resource blocks with the best quality. The number N should be optimally set since it has an impact on the uplink load. The higher level control plane protocol layer information can be used to optimally set the number N at the start of the call. It can also be refined during the call by sniffing higher level control plane protocol layer packets during the call. The configuration of the mobility related measurements can also be optimized to some extend by analyzing the higher level control plane protocol layer packets. This could be performed e.g. by setting the most appropriate measurements needed for a particular service to optimize the load. This embodiment of the invention, result further in optimization such as that signal S304-305 can be skipped, i.e. leap frog RAN procedures 331b, including radio admission control, radio scheduler configuration and related RRM functions. As the information received from reading the higher level control plane protocol layer result in having information, that is today not available, already at an earlier stage, by analyzing the information conclusions can be made in 321b and the leapfrog is possible.

Another example of an embodiment according to the invention, is that of measurement initiation, whereby the UE 301 can be configured for performing some essential measurements. The measurement configuration message comprises of very comprehensive and detailed information. There are also several types of measurements and only sub-set of them might be needed at a time. Secondly UE needs to process this information and could take several frames. In other words such tasks and service negotiation phase could overlap in time.

An admission control is to be performed at various levels: by the RAN 302 and CN 303. In either case the Admission Control procedure aims to check if the available resources (e.g. measured transmit power, channelization codes, sub-carriers, resource blocks, transport network channels etc) are adequate enough to serve the demand of the requested user. The estimated demand is traditionally based on the traffic buffer, priority level assigned by the CN 303 etc. The major drawback is that this set of information is insufficient and imprecise in predicting the actual desired resources. It is therefore likely that the call can either be rejected due to over estimation of the required resources, or can be dropped due to under estimation of the required resources.

The third exemplary embodiment of the invention in FIG. 3 is described in the more detailed view of the Admission Control procedure. By receiving a more detailed input about the service due to sniffing during application control plane protocol layer signaling or cross-layer communication on signal S303c in 321c in RAN 302, the drawback described above can be avoided. In this embodiment of the invention, the admission control entity 321c sniff higher level control plane protocol layer information (e.g. packet size, service type etc of the application level packet) and combine the information received from sniffing with the state of the art parameters (e.g. buffer size) to perform admission control. As an example the maximum packet size and service type (including for instance voice or video codec type) is received from the sniffing, and by analyzing this information the RAN can derive the exact radio resource demand for that specific service prior to receiving a service request from the CN. For instance, based on the service type, the RAN derives the request bit-rate and the bit error rate target that allows the RAN to derive the required power and resource block requirements for that specific service. Based on this knowledge, the RAN can in advance of receiving a bearer request from the CN execute a precise admission control. This embodiment of the invention, result further in optimization such as that signal S304 can be skipped, i.e. leap frog RAN procedures 331c, including the regular radio admission control comprising of estimating the specific service need for radio resource and the estimation of the available radio resources. As the information received from reading the higher level control plane protocol layer result in having information, that is today not available, already at an earlier stage, by analyzing the information conclusions can be made in 321c and the leapfrog is possible.

Figure 4:
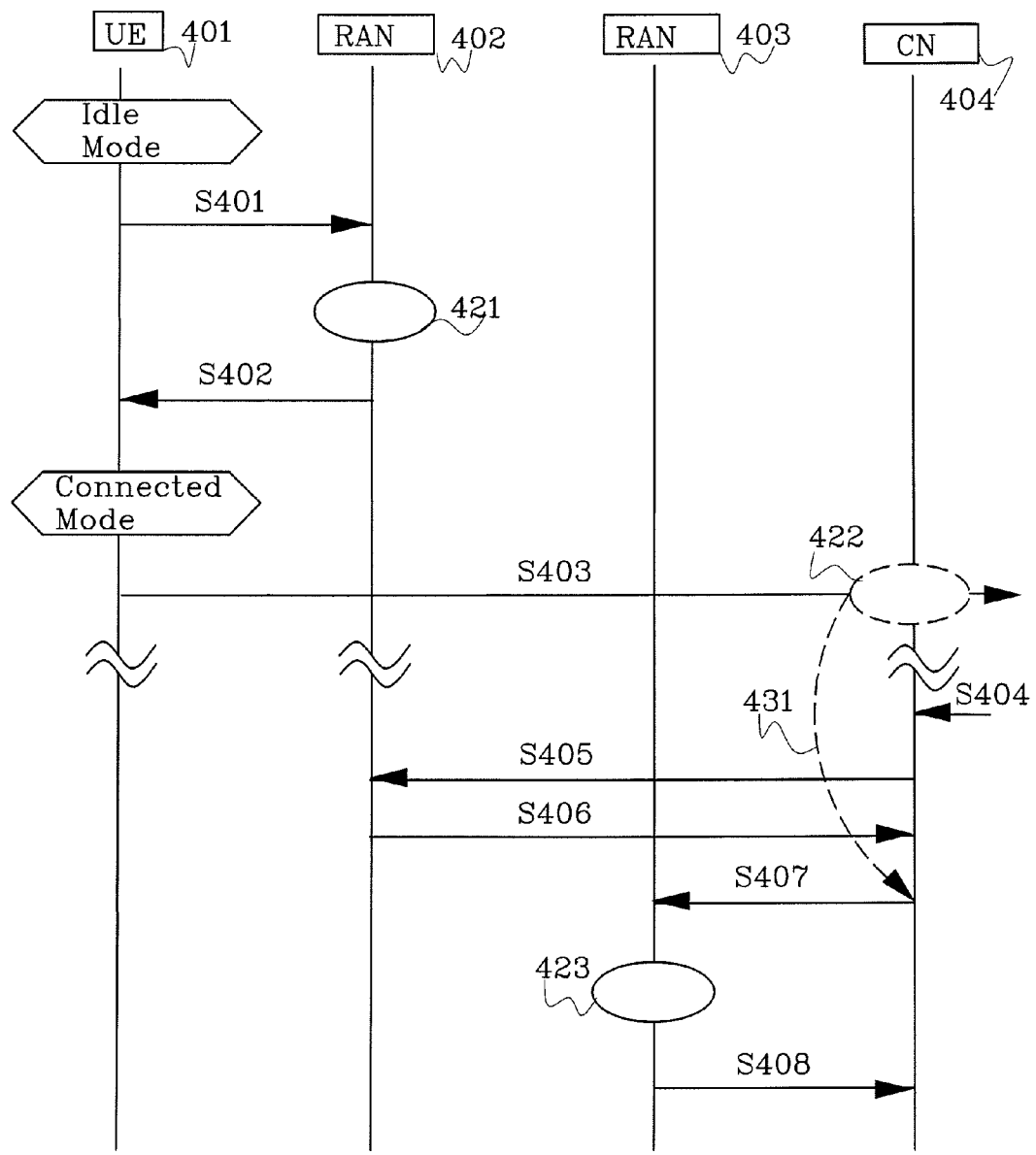
FIG. 4 is a signal diagram illustrating exemplary embodiments of exchange of signals in the cellular radio communication network, including Call Redirection to alternative radio access network according to the invention.

FIG. 4, is a signal diagram 400 illustrating exemplary embodiments in dashed lines, of early re-direction according to the invention. The call re-directions often used when RAN 402 and/or CN 404 resources are found to be insufficient to furnish the user demand. The call can be redirected either to another RAN 403 or to another access technology within the same RAN 403 or combination thereof. The call re-direction generally takes place towards the end of the Call Setup procedure, this leads to unnecessary delay. The following signals and performances in certain nodes in FIG. 1 are comparable to FIG. 4 and are thereby not described again: S101→S401, S102→S402, S103→S403, S104→S404, S105→S405, S109→S408, 121→421, 125→423. Signal S406 is e.g. a re-direct message from RAN 402 to CN 404. In this exemplary embodiment of the invention the call re-directing entity 422, which generally resides in the same node as the CN admission control sniffs the higher level control plane protocol layer information, the application control plane level protocol layer information (e.g. service type), to analyze in 422 which the most adequate access technology is that can serve the requested call at a given time. Similar application level protocol information can be used to analyze where to re-direct the calls to the most appropriate neighbor RAN 403, i.e. to less loaded RAN 403. By analyzing the information received from the sniffing, in 422 in the CN 404, according to the invention, more precise information is given regarding service type and amount of needed resources, resulting in optimization such as that the call re-direction will be more accurate. Signal S407 is a SAE Bearer Setup Request message sent from CN 404 to the neighbor RAN 403, from the RAN 402 the UE 401 is redirected to. The choice of re-direction here to the RAN 403 or choice of any re-directing at all, is done with better grounds by the analyzed information collected from sniffing the higher level control plane protocol layer. In other words more than one call re-direction will happen with lower probability. The embodiments of the invention, result in further optimization such as that signal S404-406 can be skipped, i.e. leap frog CN procedures 431, including authentications, policy translation, CN admission control and resource reservation. As the information received from reading the higher level control plane protocol layer result in having information, that is today not available, already at an earlier stage, by analyzing the information conclusions can be made in 422 and the leapfrog is possible. The overall impact is the reduction in call setup delay.

Figure 5:
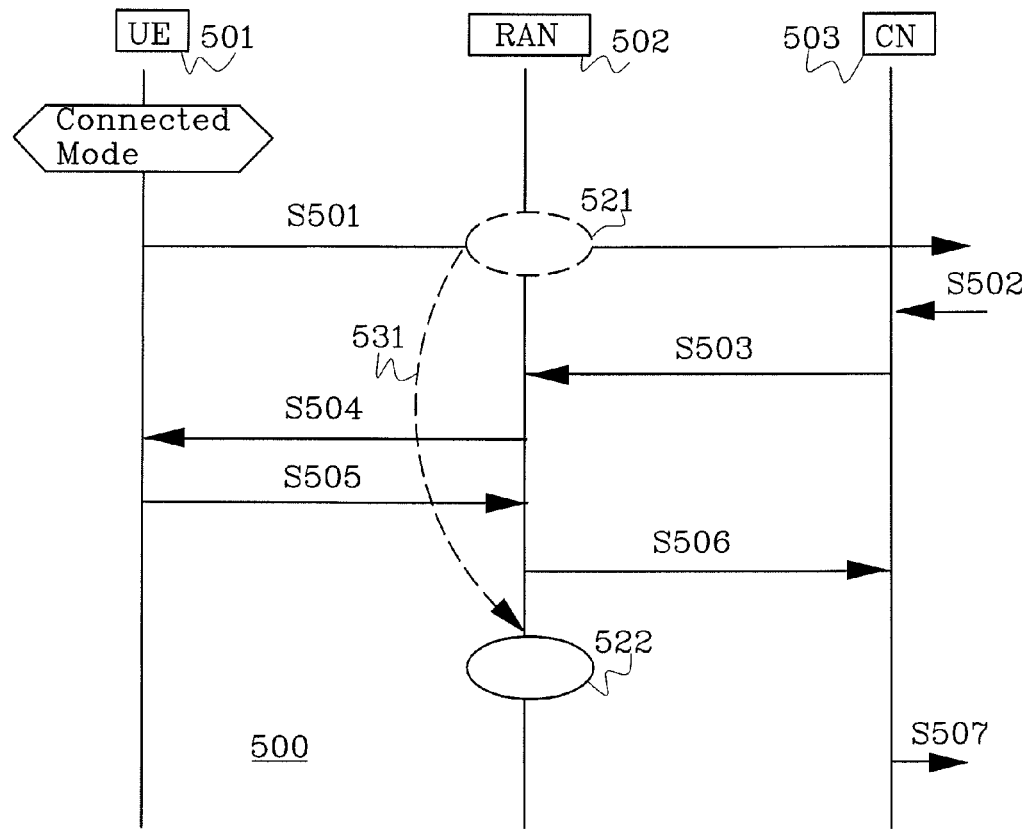
FIG. 5 is a signal diagram illustrating exemplary embodiments of exchange of signals in the cellular radio communication network, including Resource Optimization at Call Termination according to the invention.

FIG. 5, is a signal diagram 500 illustrating exemplary embodiments in dashed lines, of radio resources that are freed and made available for new incoming calls faster according to the invention. The Call Termination procedure, e.g. signal S501, terminate services such as e.g. SIP/SDP, HTTP, FTTP . . . , and is initiated by the end user UE 501 by sending a Call Terminating Request message to the server CN 503. In response to this request the de-registration procedure is activated: e.g. signal S502 SAE Bearer Termination Request message in CN 503, signal S503 SAE Bearer Termination Request message from CN 503 to RAN 502, signal S504 SAE Bearer termination request message from RAN 502 to UE 501, S505 PHY Radio Bearer Service Termination message from UE 501 to RAN 502, signal S506 SAE Bearer Termination Complete message from RAN 502 to CN 503, and signal S507 SAE Bearer Termination Complete message. The RAN 502 and CN 503 would release resources towards the end of the Call Termination procedure. However, during this phase the admission control entity may reject new calls, especially in case of heavy load. Even at moderate congestion, the admission request of one or more new users requiring high bit rate services could be rejected. To avoid those rejections described above the higher level control plane protocol layer information of users terminating their session is being sniffed or read in 521, information is collected and analyzed in 521 to translate the amount of resources to be freed, according to the exemplary embodiment of the invention. This embodiment of the invention result in optimization such as the signal S502-506 can be skipped, i.e. leap frog CN procedures 531, including Authentications, Policy Translation, CN Admission Control and Resource Reservation. In 521 in RAN 502 the amount of resources available for new incoming calls are analyzed from the information sniffed or read. These now available resources by having sniffed or read the higher level control plane protocol layer information of users terminating their session can be used to perform Pre-admission Control plane procedures of the new users requesting service.

Figure 6:
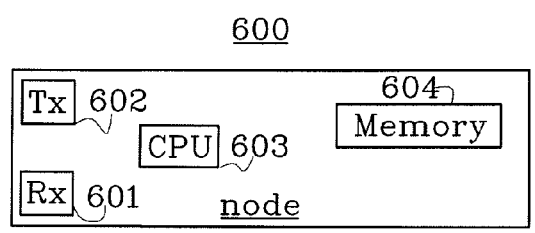
FIG. 6 is a block diagram illustrating exemplary embodiments of a function of a node according to the invention.

FIG. 6 is a block diagram illustrating a exemplary embodiment of a node 600 according to the invention for implementing the method in FIG. 2-5. A node 600 comprising a means for reading by for example a receiver RX 601, and a processing unit 603, higher level control plane protocol layer packets being transported in the network 200, 300, 400, 500 in which the node (RAN 202, 302, 402-403, or CN 203, 303, 404) is currently operating. A means for analyzing as well as a means for optimizing is performed in for example a processor unit CPU 603 in the node 600. A transceiver TX 602 is there to transmit information, e.g. retrieved analyzed data from the analyzing means. In the memory 604 the look up table can be stored.

TAB. 1 is illustrating an exemplary embodiment of a look up table according to the invention. As a person skilled in the art will appreciate any list or matrix of data can be used in searching for one item in that list or matrix of data, to obtain a value or set of values such as e.g. in a translation. According to any embodiments of the invention described above, table lookups can be a part of the analyzing part of the invention, by a data entry of the higher control plane layer information into the table lookup low control plane layer information is mapped.

Table lookups, as a person skilled in the art will appreciate, are mostly performed by routines in software. Further, lookup tables may be arranged as key-value pairs, where the keys are the data items being searched (looked up) and the values are either the actual data or pointers to where the data are located. However, to speed up operations, especially in networks, they can be performed in hardware. A table lookup may permanently reside in a program or be stored on disk and read at runtime of the signaling procedures. A table lookup may remain static (unchanged) or be dynamically updated.

TABLE 1

| Service + Application Control Plane Layer Protocol | Object ("Chunk") Size, File Size or other application specific information ("Sniffed" information) (a) | Translated information, useful for the RAN (b) | Comment (c) |
|---|---|---|---|
| HTTP or FTP (1) | (a, 1) | (b, 1) | (c, 1) |
| SIP/SDP (+MIME) (2) | (a, 2) | (b, 2) | (c, 2) |
| Wireless Hints (3) | (a, 3) | (b, 3) | (c, 3) |
| Voice or Video Codec (4) | (a, 4) | | |

This exemplary embodiment of the look up table according to the invention can for example work in the following steps:

Sniffing the application higher control plane layer protocol.

Analyzing the sniffed information, retrieving that it is a HTTP protocol (1) from the sniffed information packets. Making use of standardized protocol identifiers, in the RAN, and if necessary in the CN, the higher level control plane protocol layer is identified (e.g. Hypertext Transfer Protocol (HTTP), File Transfer Protocol (FTP) or other application specific protocols).

Analyzing further with further retrieved information such as e.g. Protocol identity, Chunk size etc. (a, 1) and from the look up table TAB. 1 above, retrieving from line 1 and column b (b, 1) the mapped information, e.g. the Packet handling priority. The certain Packet handling priority was the output of the look up table with the data entry HTTP, the certain Protocol identity, and certain Chunk size.

(a, 1):
Protocol identity
Chunk/File size
HTTP/File server address
Read/Write operation
TCP window size
(b, 1):
Packet handling priority
Target bit error rate
Target delay bound
(c, 1): The HTTP object (chunk) or file size in FTP provides knowledge to the base station about the upcoming traffic situation.
(a, 2):
Media type (audio/video)
Media format
Transport protocol
Attribute lines
Bit rate parameters
(b, 2):
Guaranteed bit rate (GBR) to be supported
Maximum Bit Rate (MBR)
Number of resource blocks
SINR target
(c, 2): Session Initiation Protocol and Session Description Protocol together with MIME information provides information about the media characteristics that the RAN needs to support.
(a, 3):
Expected delay
Packet loss bound See IEEE Com. Mag. July 2003, pp. 159
(c, 3): Wireless Hints (as described in the prior art) and sniffing the specific codec type from application layer protocol signaling provide radio specific requirements that the base station and/or the CN gateway can use to derive precise radio resource requirements useful for admission control, call redirection, UE measurement configuration and other RAN specific functions.
(a, 4): Audio/video Codec type specific information, e.g. Coding clock frequency, Coding/compression algorithm.

The methods and nodes described here are pure illustrative examples for understanding the invention and many modifications are possible, e.g. some steps/actions may be effectuated in a different/reverse order giving the same result, as a person skilled in the art realizes.

The following abbreviations and acronyms have been used in the description and in FIGS. 1-6:

| | |
|---|---|
| AC | Access Category |
| AMER | Aggregate maximum bit rate |
| ARP | Allocation retention priority |
| CQI | Channel Quality Indicator |
| eNB | evolved Node B |
| FFS | For further/future study |
| FTP | File Transfer Protocol |
| GBR | Guaranteed bit rate |
| HTTP | Hypertext Transfer Protocol |
| IMS | IP Multimedia System |
| LTE | Long Term Evolution |
| MAC | Media Access Control |
| MBR | Maximum bit rate |
| MME | Mobile Management Entity |

-continued

| | |
|---|---|
| RAC | Radio Admission Control |
| RBS | Radio base station |
| RNC | Radio network control |
| RRC | Radio Resource Control |
| RRM | Radio Resource Management |
| SAE | System architecture evolution |
| SIP | Session Initiation Protocol |
| SDP | Session Description Protocol |
| UE | User Equipment |
| WCDMA | Wide-band Code Division Multiple Access |

The invention claimed is:

1. A method for optimizing the usage of radio resources in a cellular radio communication network using a communication protocol with a plurality of communication protocol layers, each layer supporting a certain control plane procedure, the method comprising:
analyzing information received from reading higher level control plane protocol layer packets transported, before or during performance of lower level control plane protocol layer procedures, wherein the reading starts at a start of a certain session of a higher level control plane protocol layer procedure, and/or end at an end of a certain session of a higher level control plane protocol layer procedure, or starts when a certain active session of a higher level control plane protocol layer is being modified, or starting only if the radio access network is ordered by the Operation and Maintenance Subsystem; and
optimizing the lower level control plane protocol layer procedures by using the analyzed higher level control plane information received.

2. The method according to claim 1, wherein said certain session comprises of service negotiations or service re-negotiations between said user equipment and said node and/or said certain session is setting up a service requested by said user equipment between an application server and radio access network or core network.

3. The method according to claim 1, wherein the reading of higher level control plane protocol layer packets comprises reading application level control plane protocol layer packets.

4. The method according to claim 1, wherein the analyzing comprises translating from the higher level control plane protocol layer packets including a header of said packets and/or information elements of a payload of said packets into measurement initiation.

5. The method according to claim 1, wherein the analyzing comprises in case authentication is not needed translating from the higher level control plane protocol layer packets including a header of said packets and/or information elements of a payload of said packets into which radio access network and/or core network that could directly start possible procedures during the service negotiation.

6. The method according to claim 1, wherein the analyzing comprises translating from the higher level control plane protocol layer packets including a header of said packets and/or information elements of a payload of said packets into early measurement control configuration that can be initiated.

7. The method according to claim 1, wherein the analyzing comprises translating from the higher level control plane protocol layer packets including a header of said packets and/or information elements of a payload of said packets into configuring parameters of measurement control more accurately.

8. The method according to claim 1, wherein the analyzing comprises translating from the higher level control plane protocol layer packets including a header of said packets and/or information elements of a payload of said packets into optimally setting a best number N of CQI.

9. The method according to claim 1, wherein the analyzing comprises translating from the higher level control plane protocol layer packets including a header of said packets and/or information elements of a payload of said packets into setting most appropriate measurements needed for a particular service to optimize load.

10. The method according to claim 1, wherein the analyzing comprises combining the information received from reading the higher level control plane protocol layer packets with information of a priority level, which are set as a consequence of negotiation between different network entities.

11. The method according to claim 1, wherein the analyzing comprises translating input from information read from higher level control plane protocol layer packets by a look up table with outputs of stored higher level control plane layer specific parameters.

12. The method according to claim 1, further comprising:
constructing a look up table of parameters received during said reading of said higher level control plane protocol layer, and the construction of said look up table is performed by filling in said look up table with parameters read that are supporting a procedure to be improved.

13. The method according to claim 1, wherein the reading of higher level control plane protocol layer packets and/or the analyzing of higher level control plane protocol layer packets is done in a node wherein the higher level control plane protocol layer packets are being transported through.

14. A node in a radio communication network for optimizing the usage of radio resources, using a communication protocol with a plurality of communication protocol layers, each layer supporting a certain control plane procedure such as control signaling, traffic control and managing radio network resources between at least one user equipment and said node, or between said node and at least another node in said network, the node comprising:
means for reading higher level control plane protocol layer packets before or during performance of lower level control plane protocol layer procedures, wherein the means for reading starts reading at a start of a certain session of a higher level control plane protocol layer procedure, or starts when a certain active session of a higher level control plane protocol layer procedure is being modified, and/or end reading at an end of a certain session of a higher level control plane protocol layer procedure, and/or starts only if the radio access network is ordered by the Operation and Maintenance Subsystem;
means for analyzing said higher level control plane protocol layer packets received from reading;
means for optimizing the lower level control plane protocol layer procedures by using the analyzed higher level control plane protocol layer packets received.

15. The node according to claim 14, wherein a means for analyzing further comprises
means for translating from the higher level control plane protocol layer packets including the header of said packets and/or the information elements of the payload of said packets into radio resources to be pre-assigned, or
means for translating from the higher level control plane protocol layer packets including the header of said packets and/or the information elements of the payload of said packets into user equipment- and network capabilities to be exchanged in between said user equipment and said node in the network, or means for translating from the higher level control plane protocol layer packets including the signaling of some quality target into power controlling to be set up.

16. The node according to claim 14, wherein a means for analyzing further comprises means for combining the information received from reading the higher level control plane protocol layer packets with information of the priority level, which are set as a consequence of (re-)negotiation between different network entities.

17. The method according to anyone of claim 14, wherein a means for analyzing further comprises means for translating input from information read from higher level control plane protocol layer packets by a look up table with outputs of stored higher level control plane layer specific parameters.

18. The node according to claim 14, wherein a means for analyzing further comprises means for constructing a look up table of parameters received during said reading of said higher level control plane protocol layer, and the construction of said look up table is performed by filling in said look up table with parameters read that are supporting a procedure to be improved.

* * * * *